United States Patent [19]
Lien

[11] Patent Number: 5,803,472
[45] Date of Patent: Sep. 8, 1998

[54] MULTIUSAGE ICE BOX

[76] Inventor: Chang Mei Lien, P.O Box 453, Taichung, Taiwan

[21] Appl. No.: 866,739

[22] Filed: May 30, 1997

[51] Int. Cl.[6] ............................. B65D 45/00; B65D 43/00

[52] U.S. Cl. ...................... 280/47.26; 206/223; 206/216; 108/129

[58] Field of Search ............................... 280/47.26, 47.19; 108/129, 125, 127, 132, 25, 26, 11

[56] References Cited

U.S. PATENT DOCUMENTS

| | | | |
|---|---|---|---|
| 5,438,938 | 8/1995 | Meeker et al. | 108/127 |
| 5,551,558 | 9/1996 | Bureau | 206/223 |

*Primary Examiner*—Gary C. Hoge
*Assistant Examiner*—Clovia Hamilton

[57] ABSTRACT

A portable ice box including two folding tables and two folding chairs. The tables are supported by U-shaped frame members positionable in a position extending below the tables. The U-shaped frame members have ball ends which are inserted in clamp seats disposed in two corners of each table.

4 Claims, 4 Drawing Sheets

MULTIUSAGE ICE BOX

The present invention relates to a multiusage ice box.

An object of the present invention is to provide a multiusage ice box which has at least a folded table and a folded chair.

FIG. 1A is a perspective view of a clamp seat;

Figure 1:
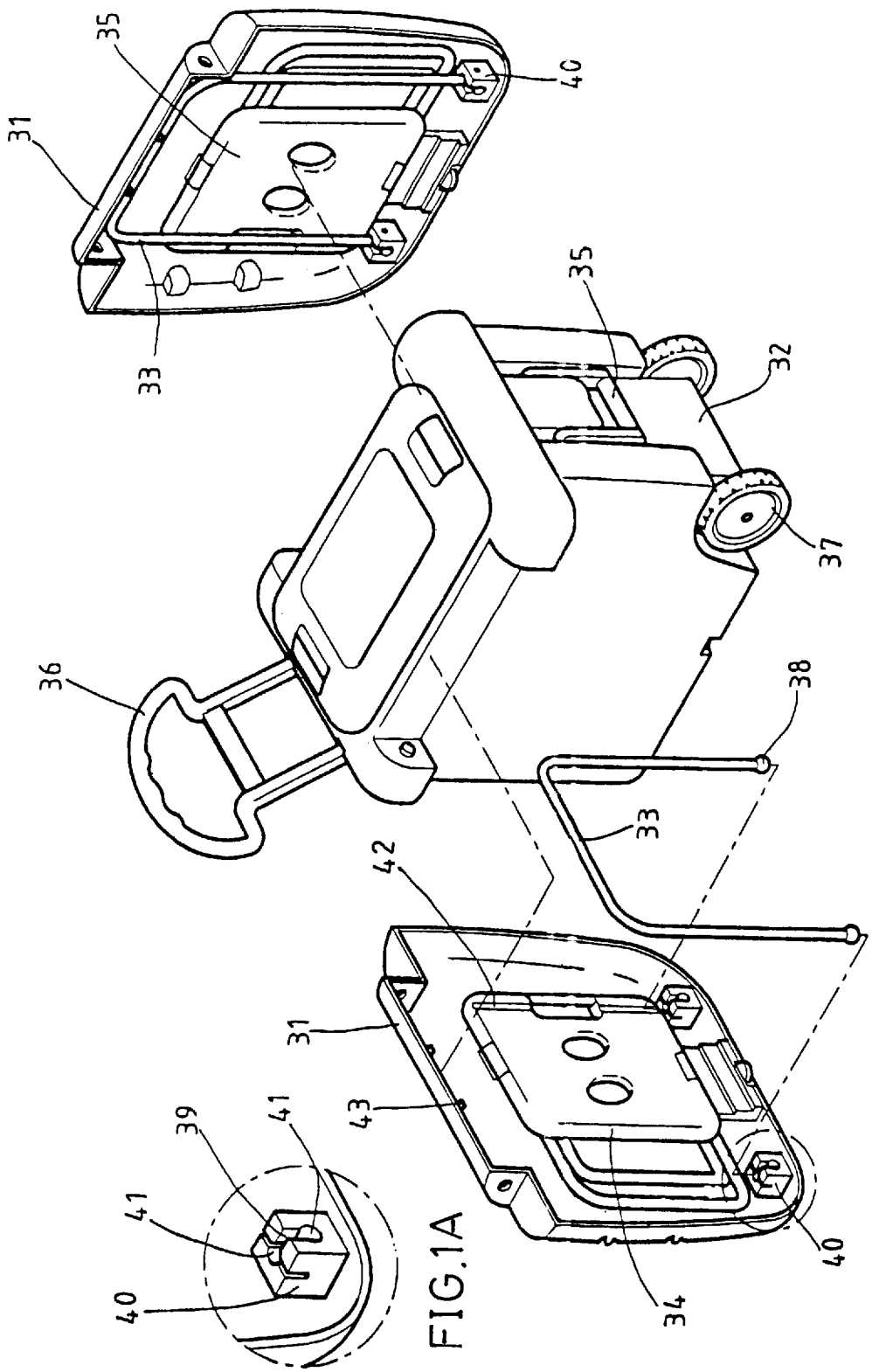
FIG. 1 is a perspective exploded view of a multiusage ice box.
Figure 2:
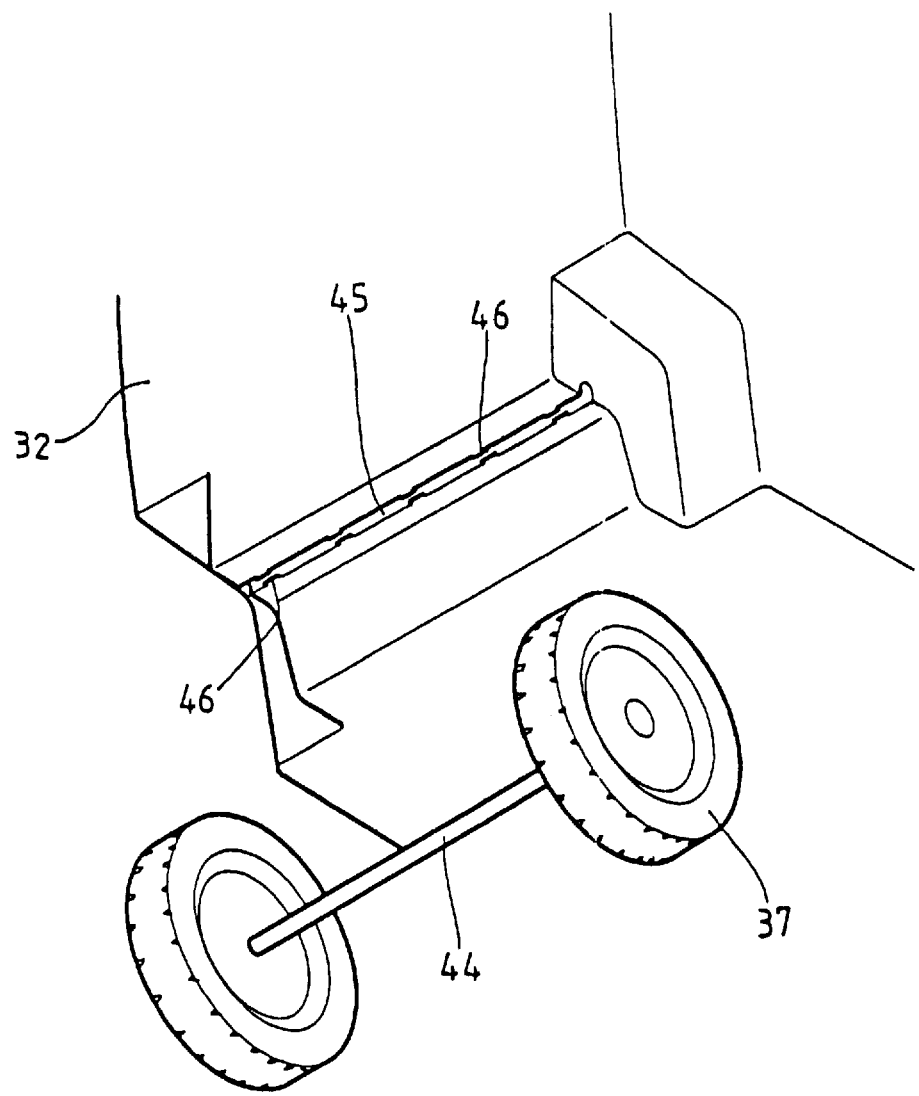
FIG. 2 is a partially perspective exploded view of a main box and two wheels.
Figure 3:
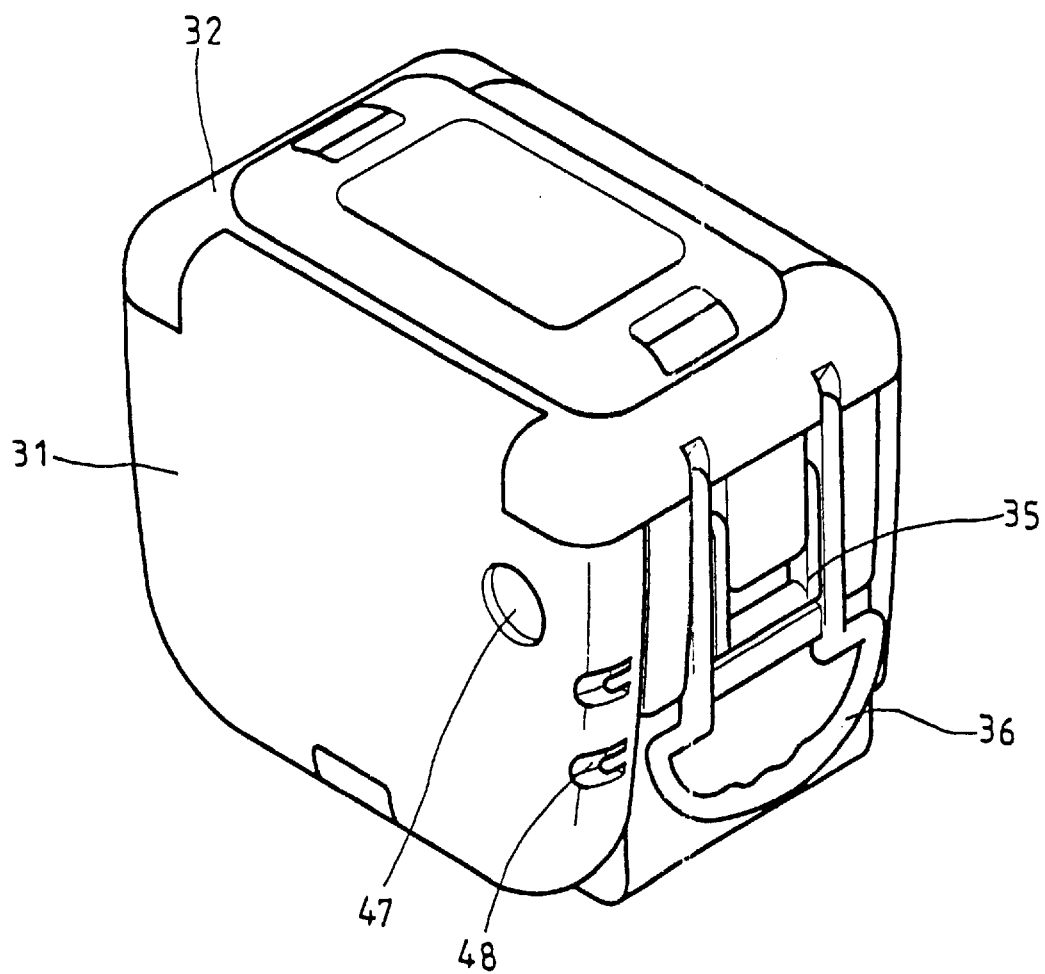
FIG. 3 is a perspective assembly view of a multiusage ice box while two tables are folded.

Referring to FIGS. 1 to 3, a multiusage ice box comprises a main box 32, a first table 31 engaging with a first lateral of the main box 32, a second table 31 engaging with a second lateral of the main box 32, a first folded chair 34 disposed in the first table 31, a second folded chair 34 disposed in the second table 31, a handle 36 disposed on the main box 32, a first lug 35 disposed on the main box 32 and surrounded by the handle 36, a second lug 35 disposed on the main box 32 opposite to the first lug 35, a recess hole 45 and a cage flange 46 formed at a bottom of the main box 32, an axle 44 inserted in the recess hole 45, a first wheel 37 disposed on a first end of the axle 44, and a second wheel 37 disposed on a second end of the axle 44.

A first clamp seat 40 is disposed in a first corner of the first table 31. A second clamp seat 40 is disposed in a second corner of the first table 31. A third clamp seat 40 is disposed in a first corner of the second table 31. A fourth clamp seat 40 is disposed in a second corner of the second table 31. Each of the clamp seats 40 has a slide slot 39 and two cage grooves 41 communicating with the slide slot 39. A first U-shaped frame 33 has a first ball end 38 inserted in the first clamp seat 40 and a second ball end 38 inserted in the second clamp seat 40. A second U-shaped frame 33 has a third ball end 38 inserted in the third clamp seat 40 and a fourth ball end 38 inserted in the fourth clamp seat 40. A plurality of first protrusions 43 are disposed on the first table 31 to cage the first U-shaped frame 33. A plurality of second protrusions 43 are disposed on the second table 31 to cage the second U-shaped frame 33. The first table 31 has a first through hole 47 to hold a cup and a plurality of first ears 48 to hang the bags. The second table 31 has a second through hole 47 to hold a cup and a plurality of second ears 48 to hang the bags. The first folded chair 34 has a first groove 42. The second folded chair 34 has a second groove 42.

Figure 4:
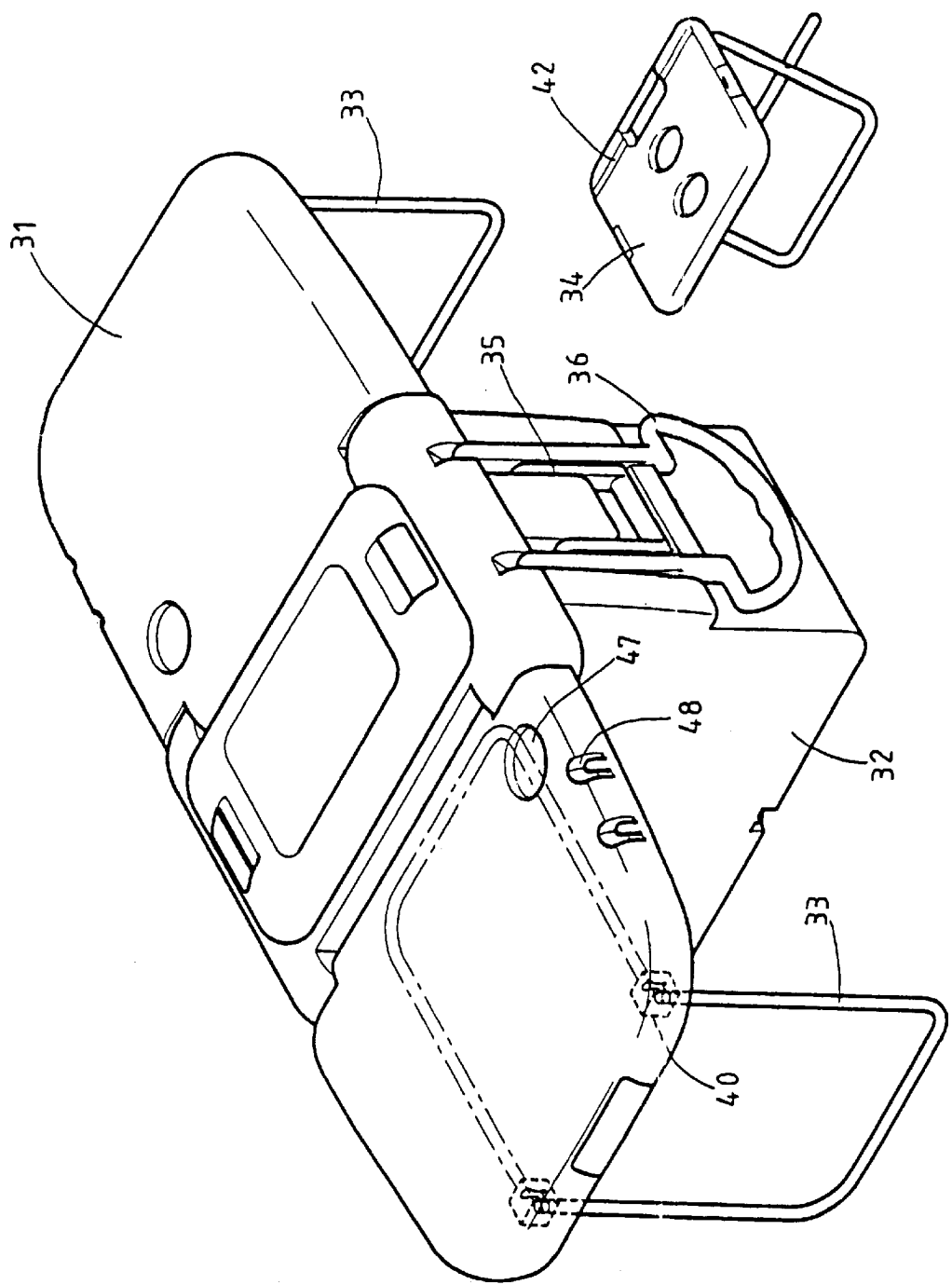
FIG. 4 is a perspective assembly view of a multiusage ice box while two tables are extended.

Referring to FIG. 4, the first table 31 and the second table 31 can be extended. The first folded chair 34 and the second folded chair 34 can be extended also.

I claim:

1. A multiusage ice box comprises a main box, a first table 31 engaging with a first lateral of the main box 32, a second table 31 engaging with a second lateral of the main box 32, a first folded chair 34 disposed in the first table 31, a second folded chair 34 disposed in the second table 31, a handle 36 disposed on the main box 32, a first lug 35 disposed on the main box 32 and surrounded by the handle 36, a second lug 35 disposed on the main box 32 opposite to the first lug 35, a recess hole 45 and a cage flange 46 formed at a bottom of the main box 32, an axle 44 inserted in the recess hole 45, a first wheel 37 disposed on a first end of the axle 44, a second wheel 37 disposed on a second end of the axle 44, and the improvement wherein:

a first clamp seat 40 is disposed in a first corner of the first table 31, a second clamp seat 40 is disposed in a second corner of the first table 31, a third clamp seat 40 is disposed in a first corner of the second table 31, a fourth clamp seat 40 is disposed in a second corner of the second table 31, each of the clamp seats 40 has a slide slot 39 and two cage grooves 41 communicating with the slide slot 39, a first U-shaped frame 33 has a first ball end 38 inserted in the first clamp seat 40 and a second ball end 38 inserted in the second clamp seat 40, a second U-shaped frame 33 has a third ball end 38 inserted in the third clamp seat 40 and a fourth ball end 38 inserted in the fourth clamp seat 40.

2. A multiusage ice box as claimed in claim 1, wherein a plurality of first protrusions 43 are disposed on the first table 31 to cage the first U-shaped frame 33 and a plurality of second protrusions 43 are disposed on the second table 31 to cage the second U-shaped frame 33.

3. A multiusage ice box as claimed in claim 1, wherein the first table 31 has a first through hole 47 and a plurality of first ears 48 and the second table 31 has a second through hole 47 and a plurality of second ears 48.

4. A multiusage ice box as claimed in claim 1, wherein the first folded chair 34 has a first groove 42 and the second folded chair 34 has a second groove 42.

\* \* \* \* \*